Patented Mar. 7, 1944

2,343,434

UNITED STATES PATENT OFFICE 2,343,434

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,125

23 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media may be sharply increased by contacting the oil that is filtered by the filtering media with an ester product containing a polyhydric alcohol radical, a polybasic carboxylic acid radical, and an acyl-oxy radical

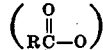

derived from a detergent-forming monocarboxy acid having 8 to 38 carbon atoms, at least one polyhydric alcohol hydroxyl being esterified with a group containing such acyl-oxy radical and the number of such groups esterified with polyhydric alcohol hydroxyls being less than the total number of polyhydric alcohol hydroxyls (esterified or unesterified) of polyhydric alcohol contained in the product. In other words, the number of the groups comprising an acyl-oxy radical containing 8 to 38 carbon atoms and derived from a detergent-forming mono-carboxy acid having 8 to 38 carbon atoms that are ester linked to at least one polyhydric alcohol radical is less than the valency of the said polyhydric alcohol radical.

The ester product may be added to a filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having a high dirt removal rate.

Polybasic carboxy acids which may be employed in the esterification reaction may be exemplified by phthalic, succinic, malic, fumaric, citric, citriconic, maleic, adipic, tartaric, oxalic or the like. The anhydrides of such polybasic carboxy acids such as phthalic anhydride, maleic anhydride, etc., are the equivalents of the acids and in some respects are even more advantageous than the acids in the production of esters. When reference is made to polybasic carboxy acids the anhydrides thereof are also included. Other suitable polybasic acids may be prepared by the diene synthesis which involves condensation of alpha, beta unsaturated acids or anhydrides with compounds containing a conjugated double bond. For example, the condensation of maleic anhydride with alpha terpinene yields a dicarboxy acid which is suitable. Other polybasic carboxy acids may be prepared similarly by the diene synthesis involving condensation of an alpha, beta unsaturated monocarboxy acid with a carboxy acid containing a conjugated double bond. For example, crotonic acid may be condensed with abietic acid, which contains a conjugated double bond, to yield a dicarboxy acid suitable for use in the manufacture of ester products in increasing the rate of dirt removal from lubricating oils in a filtering operation. Functional equivalents of polybasic carboxy acids, such as chlorphthalic acid, may be employed.

Detergent-forming monobasic carboxy acids are those acids having at least 8 carbon atoms which have the capacity to react with alkali to form soap or soap-like products and are exemplified by fatty acids containing 8 to 32 carbon atoms such as oleic, linoleic, ricinoleic, stearic, hydrostearic, palmitic, linolenic, erucic, clupanodonic, myristic, etc., and fatty acids of the character referred to are normally regarded as preferable. The term detergent-forming carboxy acid includes naphthenic acids. Naphthenic acids are derived from various petroleums or are obtained by treatments which involve oxidation of hydrocarbon bodies present in the naturally occurring crude oils. The number of carbon atoms in naturally occurring naphthenic acids may vary from 10 carbon atoms to 38 carbon atoms. Naphthenic acid, or admixtures, of the type available on the open market, and which preferably have a saponification value in the neighborhood of about 250, are suitable.

Naphthenic acids of the kind referred to are readily esterified with glycerine to form naphthenin on intimate admixture and agitation in the presence of dried hydrochloric acid gas using a procedure that is substantially the same as that usually used in the formation of stearin from stearic acid and glycerol. It is known that such naphthenic acids can be treated, for example, with halogens so as to produce derivatives such as chlornaphthenic acids. Also included among the detergent-forming acids are those mono-carboxy acids sometimes called wax acids or paraffin acids, which are formed as a result of oxidation of paraffin or petroleum waxes, particularly those derived from paraffin base hydrocarbons and which include hydroxylated, as well as non-hydroxylated acids. Acids occurring in certain waxes such as carnaubic acid, cerotic acid, lanopalmic acid and lanoceric acid, are considered detergent-forming mono-carboxy acids. Rosin and resinic acids such as abietic acid are likewise included. Such acid materials due to the fact that they react with alkalis to form soap or soap-like products are commonly called detergent-forming acids.

The terms hydroxylated detergent-forming acids or hydroxy detergent-forming acids refer to those detergent-forming acids which contain in the acyl radical thereof an hydroxyl or the equivalent. The most common types of hydroxylated detergent-forming carboxy acids are hydroxylated fatty acids containing 8 to 32 carbon atoms such as ricinoleic acid, mono- and dihydroxy stearic acid, trihydroxy palmitic acid, etc. In addition hydroxylated detergent-forming acids such as hydroxylated wax acids may be used.

While the terms detergent-forming mono-carboxy acid and hydroxylated detergent-forming mono-carboxy acid include oxidized acids as well as acids in their naturally occurring state, those fatty bodies which are drastically oxidized have distinctive properties and characteristics and certain ester products containing such drastically oxidized bodies are claimed in our application Serial No. 381,124 filed Feb. 28, 1941, for filters.

One simple type of esterification product that is illustrative of ester products referred to above is derivable in the following manner: A detergent-forming carboxy acid, e. g., a fatty acid such as oleic acid or stearic acid may be represented as RCOOH wherein RCOO is the conventional acyl-oxy radical. Such acid may be esterified with a polyhydric alcohol so as to yield a partial ester containing a free hydroxyl. Thus if 1 mole of the detergent-forming acid (e. g. stearic acid) is reacted with one mole of glycol, the reaction may be indicated as follows:

$$RCOOH + C_2H_4(OH)_2 \rightarrow RCOOC_2H_4OH + H_2O$$

The partial ester thus formed may be reacted with a polybasic carboxylic acid, phthalic anhydride being selected for purposes of exemplification, as follows:

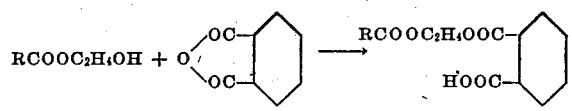

to yield a product that is suitable for increasing the dirt removal rate of filtering media according to this invention.

Similarly a detergent-forming carboxy acid of the RCOOH type may be reacted with glycerol or polyglycols or polyglycerols. Typical partial esters containing a polyhydric alcohol radical and containing one or more hydroxyl groups which are not esterified with a group containing acyl-oxy radicals derived from a detergent-forming carboxy acid are RCOOC$_3$H$_5$(OH)$_2$
(RCOO)$_2$C$_3$H$_5$OH
RCOOC$_2$H$_4$OC$_2$H$_4$OH
(RCOO)$_2$C$_3$H$_5$OC$_3$H$_5$(OH)$_2$

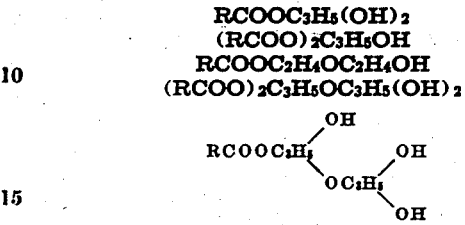

The reaction of the first of the foregoing compounds with phthalic anhydride illustrates the resulting ester formation with a polybasic carboxy acid and is as follows:

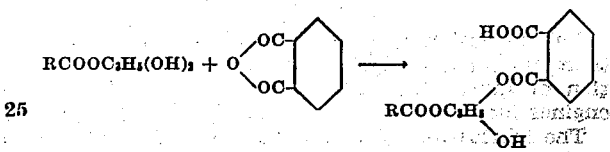

The other free hydroxyl may also be esterified with a molecule of phthalic anhydride. Likewise similar reactions with any or all of the free hydroxyls of the other compounds listed above may take place to form products of esterification suitable for use in increasing the dirt removal rate of filtering media according to this invention.

Other examples of polyhydric alcohols which may be employed to form partial esters of the character referred to are ethylene glycol, alpha, beta gamma butane triol, beta methyl glycol, triethylene glycol, 1,3-propane diol, isobutylene glycol, ethylene glycol, glycerol ether, monoethylene glycol ether, mannitol, sorbitol, sorbitol monobutyl ether, erythriol, adonitol, mannitan, sorbitan, etc.

While as above illustrated, a detergent-forming monocarboxy acid may be reacted with a polyhydric alcohol to yield a partial ester having one or more residual hydroxyls available for esterification with a polybasiccarboxy acid, it is also possible to first react a polybasic carboxy acid with a polyhydric alcohol to yield an ester having one or more unreacted hydroxy groups available for esterification with a detergent-forming monocarboxy acid. However, the reaction is usually easier to control if the polyhydric alcohol used is first reacted with a detergent-forming acid and the fractional ester thus obtained is subsequently reacted with a polybasic acid. In either case the resulting product is regarded as a product of esterification between a polybasic carboxy acid and an hydroxylated ester of a detergent-forming monocarboxy acid.

The hydroxy esters employed for reaction with polybasic acids to form ester products adapted to increase the dirt removal rate of filtering media according to the present invention, need not necessarily be prepared by reacting the detergent-forming acid with the polyhydric alcohol directly. In many instances it is more convenient to prepare these hydroxy esters by re-esterification of fats, oils, or detergent-forming acid esters with polyhydric alcohols. For example, a fat such as stearin may be re-esterified with glycerol to form glycerol monostearate which may subsequently be reacted with a polybasic carboxy acid. Such partial esters are mentioned inasmuch as they are commonly produced and are available on the open market. Similar products are obtained by re-esterification of oils, fats, and detergent-forming acid esters with other polyhydric alcohols, such as glycols, sorbitol, mannitol, etc. Analogous partial esters may be obtained from rosin acid, naphthenic acid, or the like.

It is also possible to perform the re-esterification simultaneously with the esterification of the polybasic acid. For example, a mixture of a fatty oil, a polyhydric alcohol and a polybasic acid may be mixed and heated together to yield an ester product that may be used according to this invention.

If the detergent-forming carboxy acid is hydroxylated, e. g. is an hydroxylated fatty acid such as ricinoleic acid, hydroxy stearic acid or the like and has the carboxylic hydrogen replaced by a hydrocarbon or oxy hydrocarbon containing one or more hydroxyls, the foregoing typical formulae for hydroxy containing esters of detergent-forming carboxy acids would appear as $$OHRCOOC_3H_5(OH)_2$$
$$(OHRCOO)_2C_3H_5OH$$
$$OHRCOOC_2H_4OH$$
$$OHRCOOC_2H_4OC_2H_4OH$$
$$(OHRCOO)_2C_3H_5OC_3H_4(OH)_2$$

$$OHRCOOC_3H_5\begin{matrix}OH\\OC_3H_5\\OH\end{matrix}\begin{matrix}OH\\\\OH\end{matrix}$$

Examples of such materials are glyceryl monoricinoleate, glyceryl diricinoleate, ethylene glycol dihydroxy stearate, sorbitol di-dihydroxy stearate, etc.

Taking the first of the foregoing formulae as illustrative, the reaction with phthalic acid or anhydride may result in a number of ester products the following being illustrative:

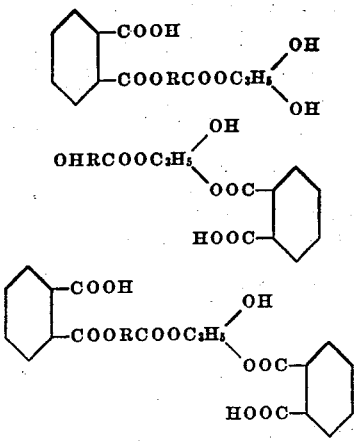

Similarly, one or more of the hydroxyls of the other compounds may become esterified with a carboxyl of phthalic acid or other polybasic carboxy acid.

If the esterification conditions are quite severe, namely, at a relatively high temperature and for a prolonged interval of time, both of the carboxyls of the polybasic carboxy acid may react with hydroxyls present in the partial ester to form a compound such as

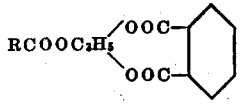

in which there is no free carboxyl and which comprises a closed ring structure heterocyclic in character. While such compounds are suitable it is preferable that the reaction be carried out so that there will be a free carboxyl group in the ester product. Whether or not the ultimate ester product contains a residual hydroxyl group is largely immaterial.

In carrying out an esterification reaction involving a polyhydric alcohol, a detergent-forming carboxy acid and a polybasic carboxy acid it does not necessarily follow that the polyhydric alcohol radical inevitably becomes directly connected to the acyl-oxy group of the detergent-forming carboxy acid when the detergent-forming carboxy acid is hydroxylated. For example, a detergent-forming carboxylic body such as ricinoleic acid ethyl ester may be esterified with phthalic acid to form the partial ester

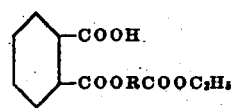

which may be further esterified with glycol, for example, to form a product which may be represented by the formula

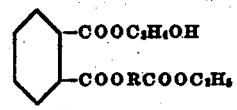

and it may be noted that the product contains a polyhydric alcohol radical and contains only one acyl-oxy radical derived from a detergent-forming carboxy acid in a group that is esterified with an hydroxyl of the polyhydric alcohol. Since part only of the hydroxyls contained in the parent polyhydric alcohol are esterified with a group containing such acyl-oxy radical, the compound above mentioned falls within the ester products of the present invention for use in increasing the dirt removal rate of filtering media. In this particular case the group containing the acyl-oxy radical (RCOO) that is esterified with an hydroxyl of the parent polyhydric alcohol is the group

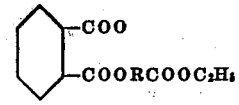

A preferred type of compound of the character just described and illustrated may be prepared by first reacting a glyceride or a glycol ester with a polybasic carboxylic acid and then neutralizing a free carboxyl group of the poly-basic carboxylic acid by esterification with a polyhydric alcohol. For example, one mole of a triglyceride such as triricinolein may be esterified with two moles of phthalic acid to produce diphthalated ricinolein which may be represented by the following formula:

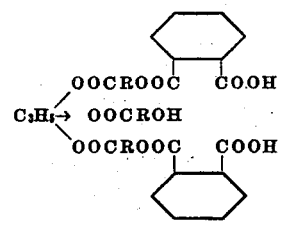

If one mole of the diphthalated triricinolein is then esterified with 2 moles of glycerol the following product may be obtained.

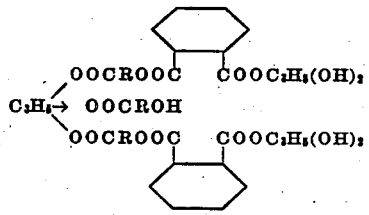

If 2 moles of diphthalated triricinolein is reacted with one mole of glycol for example, a more complex molecule may be formed by cross linkage through the glycol residue, as represented by the following formula:

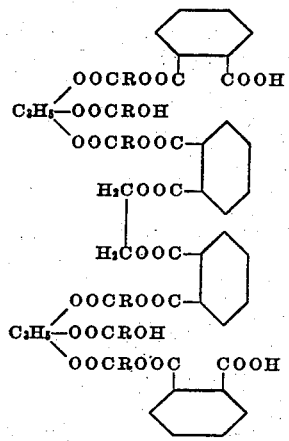

Similarly, one mole of triphthalated triricinolein may react with one mole of glycol to form a compound which may be represented by the following formula:

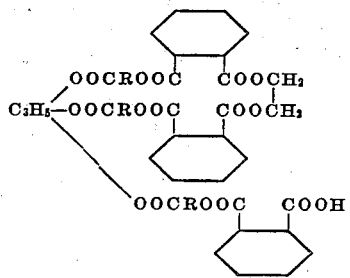

All of the compounds of the character above referred to are regarded as ester products derivable by reaction between a polybasic carboxylic acid and a hydroxy compound containing an acyl-oxy radical derived from a detergent-forming monocarboxy acid having 8 to 38 carbon atoms and containing a polyhydric alcohol residue, the number of groups that contain an acyl-oxy radical derived from a detergent-forming monocarboxy acid and that are esterified with a polyhydric alcohol hydroxyl, being less than the total number of polyhydric alcohol hydroxyls (esterified or unesterified) of polyhydric alcohol contained in the product. In such compounds it is preferable that there be at least one free carboxyl group and preferably in a polybasic carboxy acid carboxyl radical.

In the ester product the presence of a residual hydroxyl group is largely immaterial. Any such residual hydroxyl group may be left as such or, if desired, reacted either with additional polybasic carboxy acid or with monobasic detergent-forming carboxy acid provided the number of acyl-oxy groups derived from the detergent-forming carboxy acid is maintained less than the number of hydroxyls of the parent polyhydric alcohol material contained in the ester product as a residue. Alternatively, any such residual hydroxyl may be acylated with mono-carboxy acids having less than 8 carbon atoms. The ester product covered herein may include such simple acylated derivatives.

Referring to any residual carboxyl group or groups it is preferable that such group or groups be left as such. If desired, however, the carboxyl group may be converted to a metal salt such as the salt of sodium, potassium, calcium, magnesium, iron, etc. If desired the carboxyl group or groups may be reacted with an alkali metal compound and then converted by metathesis to a salt of a metal such as aluminum, copper, zinc, etc. Similarly the carboxyl group can be converted into an ammonium salt, or a substituted ammonium salt, by use of ammonia, an amine, or hydroxylated amine. When an hydroxylated amine is used the acidic hydrogen of the carboxyl group may be replaced by esterification involving the alcoholic hydroxyl of the hydroxylated amine or by simple neutralization. Examples of suitable amines or amino-alcohols are amyl amine, cyclohexylamine, ethanolamine, aminomethyl propanol, etc. The acid hydrogen may also be replaced by reaction with an alcoholiform hydroxyl of an hydroxylated acid. The acid hydrogen may, of course, be replaced by additional polyhydric alcohol residue or residues of the character above mentioned. The acid hydrogen may likewise be replaced by reaction with a monohydric alcohol. The alcohol residue may be a residue of an aliphatic alcohol such as methyl, ethyl, ceryl, glyceryl, glycyl, etc., or alicyclic, such as cyclohexanol and the like, or aralkyl such as benzyl alcohol, naphthyl ethyl alcohol, and the like. Similarly, the acid hydrogen may be replaced by reaction with an ether alcohol such as those derived by reaction of any of the foregoing alcohols with an alkylene oxide such as ethylene oxide, propylene oxide, butylene oxide, glycide, or the like, typical ether alcohols being illustrated by the following formulae:

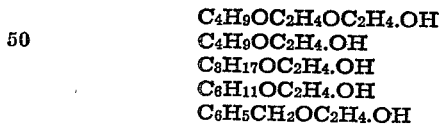

By reacting hydroxy aromatic compounds such as phenol, naphthol and the like with an alkylene oxide substance, such compounds can be converted to aralkyl ethers which are suitable and such compounds together with alphyl, alicyclic and aralkyl alcohols and alcohol ethers are regarded as alkyl alcohols and as comprising an alkyl group as the term "alkyl" is used herein. As aforesaid, aryl groups are not regarded as included in the term "alkyl" (although aralkyl groups are included). When reference is made to an ester product containing a free carboxyl group, it is intended that the product contain a COOH group in which the acid hydrogen has not been replaced. Ester products containing a carboxylic group may be in the form of an acid or a salt or an ester as mentioned hereinabove. Since, however, products containing a free carboxyl group are normally preferred, the additional expense of neutralizing the acid hydrogen of a free carboxyl is usually not incurred.

While reference has been made hereinabove to various detergent-forming monocarboxy acids, it is apparent that simple derivatives such as the halogenated compounds are functional equivalents. For example, chlorinated ricinoleic acid or chlorinated triricinolein may be employed instead of ricinoleic acid or triricinolein. Brominated oleic acid may be used instead of oleic acid. Also hydrogenated abietic acid may be used instead of abietic acid. In such cases the monobasic detergent-forming carboxy material, notwithstanding modifications of the kind indicated still has the same functional properties as the unmodified material, and thus acts in the same manner as far as esterification reactions of the character herein described are concerned. It is also possible, for example, to condense two moles of ricinoleic acid and produce one mole of monobasic diricinoleic acid. Likewise monobasic triricinoleic acid and monobasic tetraricinoleic acid may be used. Also the condensation product of a substance such as ricinoleic acid or hydroxystearic acid with some non-fatty hydroxy acid such as lactic acid may be used. It is to be understood that the term detergent-forming monobasic carboxy acid includes such functional equivalents.

Some of the ester products above described are somewhat soluble in oil while others are substantially insoluble in oil. If the ester product is such that only one part or less is soluble (as determined by usual visual methods) in one thousand parts of ordinary straight-run kerosene from Pennsylvania crude, the product is to be regarded as substantially insoluble in oil. For use in increasing the dirt removal rate of filtering media according to this invention it is preferable that the ester product be substantially insoluble in oil. Most of the ester products hereinabove described are subresinous in character and of a tarry or balsam-like consistency. In the case of some of the interacting materials, especially the polyhydroxylated bodies, it is possible by prolonged heating at relatively high temperatures to obtain a product that is of a hard horny character and lacks appreciable solubility in oil or in lower aliphatic alcohols. Care should be taken not to produce such hard and totally oil-insoluble bodies. It may be mentioned, however, that a trace of solubility such as a few parts dissolving in one hundred thousand parts of kerosene of the character above mentioned affords a satisfactory product for increasing the filtering rate of filtering media in the practice of this invention.

The production of preferred ester products which are substantially oil insoluble or of low oil solubility can readily be achieved having in mind the following factors which influence oil solubility of the ester product. Thus oil solubility is decreased when the polybasic carboxy acid employed in the esterification reaction has a relatively low number of carbon atoms. For example, a product made using phthalic acid will have less oil solubility than a product derived by reaction with naphthalic acid; and a product made using citric acid or maleic acid will have even less oil solubility than a product derived by reaction with phthalic acid. However, for most purposes single ring polybasic aromatic carboxylic acids and particularly dibasic aromatic carboxylic acids such as phthalic acid are to be preferred. Oil solubility is also affected by the nature of any substituent for the acid hydrogen of a residual carboxyl group in the ester product. Thus an ester product wherein the carboxyl group is retained has less oil solubility than a product wherein the acid hydrogen is replaced by an alkyl hydrocarbon. Ester products containing a free carboxyl group are preferred from the standpoint of their effectiveness in increasing the dirt removal rate of filtering media. Those products which contain a plurality of carboxyl groups, e. g., one for each polybasic carboxylic radical contained therein are especially to be preferred. If the acid hydrogen of a carboxyl group is replaced by an oxy alkyl group, e. g. an oxy alkyl group derived from a monohydric ether alcohol, so that the carbon atoms in the alkyl group are separated by at least one oxygen atom, the oil solubility will be decreased as compared with a product wherein the acid hydrogen of the carboxyl group is replaced by an hydrocarbon alkyl group and such compounds containing an oxy alkyl group are among preferred products for use according to this invention. Oil solubility can also be decreased by selecting a detergent-forming monobasic carboxylic body that has a relatively low number of carbon atoms. Thus fatty bodies and hydroxylated fatty bodies having a relatively low number of carbon atoms (but more than 8 carbon atoms) are to be preferred. While there are other factors affecting oil solubility, the foregoing discussion is believed to be adequate to enable one to obtain ester products having desired properties of oil solubility. While it is preferable to employ ester products which are substantially insoluble in oil as defined above, those ester products which are more soluble in oil likewise may be employed.

Generally speaking ester products hereinabove described are substantially water insoluble, namely, are not more soluble than 1 part in 1000 parts of water at 50° to 80° F. Water insolubility is not particularly important, however, because water in more than very small amounts does not occur in the oil which is used in the lubricating system of an internal combustion engine and which is clarified by the use of a filter. The ester products that are used to increase the dirt removal rate of filtering media in the practice of this invention preferably are totally or substantially water insoluble.

In the preparation of esterification products adapted for use in increasing the dirt removal rate of filtering media in a filtering operation, the esterification reaction may be caused to take place readily upon the application of heat, the reaction being more rapid the higher the temperature that is employed, but care should be taken not to employ excessively high temperatures which would cause decomposition. The reaction may, if desired, be in the presence of an inert solvent such as xylene, which may be removed upon the completion of the reaction. When water is formed as a reaction product the esterification reaction may be conducted under a reflux condenser using a water trap to remove water as it is formed. The reaction can also be hastened by passing through the reacting materials a dried inert gas such as nitrogen or $CO_2$. Generally speaking, however, the reactions take place rapidly, quickly and completely by simply heating substances to enter into the reaction in desired stoichiometric proportions at a temperature above the boiling point of water, usually between about 110° and 160° C. provided there is no decomposition. The most desirable products are obtained by compositions in which the ratio of moles of polybasic carboxylic acid to moles of hydroxylated partial ester material reacted therewith is within the ratio of 2 to 1 and 3 to 1. It is not necessary that the moles of polybasic carboxylic acid material, or of polyhydric alcohol material, or of detergent-forming carboxylic material be the same when a plurality of any or all occur in a single compound. For example, where residues of two moles of polybasic carboxylic acid material occur in a compound one may be phthalic anhydride residue and the other may be a residue of some other anhydride. It is apparent that the molecular weight of the ester product may vary widely. The molecular weight of the ester product, as determined by cryoscopic methods or from the obvious composition of the ester product usually runs between about 300 and about 4000 and seldom is over 6000. Ester products having a molecular weight over about 10,000 preferably are not employed. It may be mentioned that when the polybasic carboxylic acid is used in the anhydride form esterification can take place without forming water as a reaction product and that the use of polybasic carboxy acid in anhydride form is normally preferable for this reason.

During the esterification reaction there may be some polymerization, especially if conditions of esterification are prolonged. This polymerization is due primarily to formation of more complicated compounds from monomeric forms through formation of ester linkages with loss of water. It is to be understood that reference to ester products of the character herein referred to include possible polymerized forms as well as simple esters or monomers.

The following are specific examples of the preparation of preferred ester products for use in increasing the dirt removal rate of filtering media according to this invention:

Example 1

Mix 296 lbs. of phthalic anhydride with 92 pounds of glycerol, and heat for approximately five to ten minutes at approximately 125° C. to 150° C. until a thin, clear, water-white liquid resin intermediate, containing no unreacted phthalic anhydride, has been produced. The resin intermediate is then mixed with 312 lbs. of castor oil and the mixture is heated to from 150° C. to 250° C. for approximately ten to thirty minutes, after which it is permitted to cool and is diluted with from ten to fifty per cent. of denatured alcohol.

Example 2

Maleic anhydride is substituted for phthalic anhydride in Example 1 preceding.

Example 3

Adipic acid is substituted for phthalic anhydride in Example 1 preceding.

Example 4

Succinic acid or anhydride is substituted for phthalic anhydride in Example 1 preceding.

Example 5

One pound mole of mannitan mono-ricinoleate is esterified with three pound moles of phthalic anhydride so as to produce the acid tribasic fractional ester.

Example 6

Sorbitan mono-ricinoleate is substituted for mannitan ricinoleate in the preceding example.

Example 7

Mannitan mono-oleate or sorbitan mono-oleate is substituted for the corresponding ricinoleate in the preceding Examples 5 and 6 and the proportion of dibasic acid or anhydride is reduced so that the ratio is 2½ pound moles of the dibasic acid or anhydride for each pound mole of the oleate.

The products of the esterification reaction produced according to Examples 1 to 7 are viscous yellowish oily material resembling somewhat blown castor oil consistency. They are only slightly soluble in either water or in paraffin base mineral oil (not more than 1 part to 1000) but go into solution with lower alcohols (methyl to octyl) to form a clear solution. The solutions may be made up in equal parts for example.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can be made which can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter, and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an ester containing (a) a polyhydric alcohol radical, (b) a polybasic carboxylic acid radical, and (c) an acyl-oxy radical containing 8 to 38 carbon atoms derived from a detergent-forming monocarboxy acid having 8 to 38 carbon atoms, at least one polyhydric alcohol radical being ester-linked with a group containing said acyl-oxy radical and the number of said groups ester-linked with at least one polyhydric alcohol radical being less than the valency of said polyhydric alcohol radical.

2. A filter according to claim 1 wherein said acyl-oxy group is derived from a fatty acid having 8 to 32 carbon atoms.

3. A filter according to claim 1 wherein said acyl-oxy group is derived from a fatty acid having 8 to 32 carbon atoms and said polybasic carboxylic acid is a dibasic carboxylic acid and wherein said ester contains a plurality of free carboxyl groups.

4. A filter according to claim 1 wherein said ester comprises a product of esterification between castor oil, phthalic acid and glycerol, and said ester contains a free carboxyl group.

5. A filter according to claim 1 wherein said ester comprises a product of esterification between castor oil, maleic acid and glycerol, and said ester contains a free carboxyl group.

6. A filter according to claim 1 wherein said ester comprises a product of esterification between castor oil, adipic acid and glycerol, and said ester contains a free carboxyl group.

7. A filter according to claim 1 wherein said ester contains a free carboxyl group.

8. A filter according to claim 1 wherein the acid hydrogen of a carboxyl group is replaced by a monohydric oxy alkyl group containing at least one oxygen atom separating carbon atoms.

9. A filter according to claim 1 wherein said ester is substantially insoluble in oil.

10. A filter according to claim 1 wherein said ester is substantially insoluble in oil and is substantially insoluble in water.

11. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an ester derivable by esterfication reaction between a polybasic carboxylic acid and an hydroxylated alkyl ester of a detergent-forming monocarboxy acid having 8 to 38 carbon atoms wherein there is at least one free hydroxyl attached to the alcohol residue, said polybasic carboxylic acid not being directly ester-linked with a detergent-forming monocarboxy acid having 8 to 38 carbon atoms by neutralization of carboxylic hydrogen of said polybasic carboxylic acid with an alcoholiform hydroxyl of a detergent-forming monocarboxy acid having 8 to 38 carbon atoms.

12. A filter for use in the lubricating system of an internal combustion engine, said filter comprising a casing containing a filtering medium which is sufficiently porous to permit oil to flow therethrough but sufficiently compact to filter out solid particles, said medium having applied thereto as an agent to increase the dirt removal rate of said filtering medium an ester containing (a) a polyhydric alcohol radical, (b) a polybasic carboxylic acid radical containing 8 to 38 carbon atoms, and (c) an acyl-oxy radical derived from a detergent-forming monocarboxy acid having 8 to 38 carbon atoms, at least one polyhydric alcohol radical being ester-linked with a group containing said acyl-oxy radical and the number of said groups ester-linked with at least one polyhydric alcohol radical being less than the valency of said polyhydric alcohol radical.

13. A filter according to claim 12 wherein said acyl-oxy group is derived from a fatty acid having 8 to 32 carbon atoms.

14. A method of increasing the dirt removal rate of a filtering medium for removing dirt from the lubricating oil of an internal combustion engine, said method comprising contacting oil that is to be filtered by said filtering medium with an ester containing (a) a polyhydric alcohol radical, (b) a polybasic carboxylic acid radical containing 8 to 38 carbon atoms, and (c) an acyl-oxy radical derived from a detergent-forming monocarboxy acid having 8 to 38 carbon atoms, at least one polyhydric alcohol radical being ester-linked with a group containing said acyl-oxy radical and the number of said groups esterified with at least one polyhydric alcohol radical being less than the valency of said polyhydric alcohol radical.

15. A method according to claim 14 wherein each acyl-oxy group in the ester is derived from a fatty acid having 8 to 32 carbon atoms.

16. A method according to claim 14 wherein said acyl-oxy group is derived from a fatty acid having 8 to 32 carbon atoms and said polybasic carboxylic acid is a dibasic carboxylic acid and wherein said ester contains a plurality of carboxyl groups.

17. A method according to claim 14 wherein said ester comprises a product of esterification between castor oil, phthalic acid and glycerol and said ester contains a free carboxyl group.

18. A method according to claim 14 wherein said ester comprises a product of esterification between castor oil, maleic acid and glycerol and said ester contains a free carboxyl group.

19. A method according to claim 14 wherein said ester comprises a product of esterification between castor oil, adipic acid and glycerol and said ester contains a free carboxyl group.

20. A method according to claim 14 wherein said ester contains a free carboxyl group.

21. A method according to claim 14 wherein the acid hydrogen of a carboxyl group is replaced by a mono-hydric oxy alkyl group containing at least one oxygen atom separating carbon atoms.

22. A method according to claim 14 wherein said ester is substantially insoluble in oil.

23. A method according to claim 12 wherein said ester is substantially insoluble in oil and is substantially insoluble in water.

DONALD H. WELLS.
MELVIN DE GROOTE.

CERTIFICATE OF CORRECTION.

Patent No. 2,343,434.   March 7, 1944.

DONALD H. WELLS, ET AL.

It is hereby certified that error appears in the printed specification of the above numbered patent requiring correction as follows: Page 7, second column, lines 69 and 70, claim 12, for "radical containing 8 to 38 carbon atoms, and (c) an acyl-oxy radical" read --radical, and (c) an acyl-oxy radical containing 8 to 38 carbon atoms--; page 8, first column, lines 12 and 13, claim 14, strike out "containing 8 to 38 carbon atoms" and insert the same after "radical" in line 14, same claim; and second column, line 23, claim 23, for the claim reference numeral "12" read --14--; and that the said Letters Patent should be read with this correction therein that the same may conform to the record of the case in the Patent Office.

Signed and sealed this 23rd day of May, A. D. 1944.

Leslie Frazer (Seal)   Acting Commissioner of Patents.

CERTIFICATE OF CORRECTION.

Patent No. 2,343,434. March 7, 1944.

DONALD H. WELLS, ET AL.

It is hereby certified that error appears in the printed specification of the above numbered patent requiring correction as follows: Page 7, second column, lines 69 and 70, claim 12, for "radical containing 8 to 38 carbon atoms, and (c) an acyl-oxy radical" read --radical, and (c) an acyl-oxy radical containing 8 to 38 carbon atoms--; page 8, first column, lines 12 and 13, claim 14, strike out "containing 8 to 38 carbon atoms" and insert the same after "radical" in line 14, same claim; and second column, line 23, claim 23, for the claim reference numeral "12" read --14--; and that the said Letters Patent should be read with this correction therein that the same may conform to the record of the case in the Patent Office.

Signed and sealed this 23rd day of May, A. D. 1944.

Leslie Frazer (Seal) Acting Commissioner of Patents.